(12) United States Patent
Wood (10) Patent No.: US 9,153,079 B1
(45) Date of Patent: Oct. 6, 2015

(54) SYSTEM AND METHOD OF AUTOMATED 3D SCANNING FOR VEHICLE MAINTENANCE

(71) Applicant: Robert Bruce Wood, Los Gatos, CA (US)

(72) Inventor: Robert Bruce Wood, Los Gatos, CA (US)

( * ) Notice: Subject to any disclaimer, the term of this patent is extended or adjusted under 35 U.S.C. 154(b) by 37 days.

(21) Appl. No.: 14/218,934

(22) Filed: Mar. 18, 2014

(51) Int. Cl.
| G06Q 40/00 | (2012.01) |
| G07C 5/08 | (2006.01) |
| G07C 5/00 | (2006.01) |
| G06Q 40/08 | (2012.01) |
| G06Q 30/02 | (2012.01) |

(52) U.S. Cl.
CPC .......... *G07C 5/0808* (2013.01); *G06Q 30/0283* (2013.01); *G06Q 40/08* (2013.01); *G07C 5/008* (2013.01); *G07C 5/0841* (2013.01); Y10S 901/44 (2013.01)

(58) Field of Classification Search
CPC . G06Q 40/08; G06Q 30/0283; G07C 5/0808; G07C 5/0841; G07C 5/008
USPC .......................... 701/31.5; 348/47; 705/4, 40
See application file for complete search history.

(56) References Cited

U.S. PATENT DOCUMENTS

| 5,506,683 | A | 4/1996 | Yang et al. |
| 8,405,837 | B2 | 3/2013 | Nagle, II et al. |
| 8,443,301 | B1 | 5/2013 | Easterly et al. |
| 8,756,085 | B1 * | 6/2014 | Plummer et al. ................ 705/4 |
| 2009/0138290 | A1 * | 5/2009 | Holden ............................ 705/4 |
| 2009/0265193 | A1 * | 10/2009 | Collins et al. .................... 705/4 |
| 2002/0290259 | | 11/2012 | McAfee et. al. |
| 2014/0267627 | A1 * | 9/2014 | Freeman et al. ................ 348/47 |

FOREIGN PATENT DOCUMENTS

CN 203125521 U 8/2013

* cited by examiner

*Primary Examiner* — Marthe Marc-Coleman
(74) *Attorney, Agent, or Firm* — Stephen E. Zweig (57) ABSTRACT

System and method for using automated 3D scans to diagnose the mechanical status of substantially intact vehicles. One or more processor controlled 3D scanners utilize optical and other methods to assess the exposed surfaces of various vehicle components. Computer vision and other computerized pattern recognition techniques then compare the 3D scanner output versus a reference computer database of these various vehicle components in various normal and malfunctioning states. Those components judged to be aberrant are flagged. These flagged components can be reported to the vehicle users, as well as various insurance or repair entities. In some embodiments, the 3D scans can be performed using time-of-flight cameras, and optionally infrared, stereoscopic, and even audio sensors attached to the processor controlled arm of a mobile robot. Much of the subsequent data analysis and management can be done using remote Internet servers.

19 Claims, 4 Drawing Sheets

SYSTEM AND METHOD OF AUTOMATED 3D SCANNING FOR VEHICLE MAINTENANCE

BACKGROUND OF THE INVENTION

1. Field of the Invention

This invention is in the field of systems and methods for automated vehicle problem diagnosis and maintenance.

2. Description of the Related Art

Modern vehicles, such as automobiles, typically have a variety of built in sensors, as well as various microcontrollers, microprocessors (processors) designed to detect a variety of different problems. These sensors can detect problems such as improper fuel/air mixes, alternator problems, overheating, low oil or water levels, improper tire pressure, low brake fluid, and other types of component malfunctions.

Nonetheless, there remain many situations where such built-in sensors fail to detect various types of worn or damaged vehicle components. To compensate for this problem, automobile users, for example, are often instructed to bring their vehicles in for maintenance inspections at various standard intervals (e.g. every 5,000 miles). During these maintenance inspections, a human mechanic will visually inspect various portions of the vehicle, such as the engine and suspension. The mechanic will, for example, visually note various engine problems such as cracked or broken radiator hoses, worn belts (e.g. fan belts, alternator belts), as well as note various suspension problems such as broken or slipped leaf springs, leaking steering racks, and the like.

These prior art inspections are thus done manually. They tended to rely heavily upon the ability of the mechanic to look at the exposed surfaces of various vehicle components, and detect problems by eye.

Although the most vehicle inspections are done manually, a few automated methods of inspecting vehicle components, or vehicle related components, are also known in the art. For example, McAlfee et. al., in US patent publication 2012/0290259, disclosed a portable optical metrology inspection station and method of operation. In this disclosure, parts (which could be isolated vehicle components) were placed in a cabinet, and a multi-axis robotic arm moved the part while the part was scanned by an optical metrology scanner. Computer software then analyzed the geometric dimensions of the isolated part versus a 3D CAD model.

By contrast, Yang et. al., in U.S. Pat. No. 5,506,683 taught a non-contact measuring apparatus and method for the section profile of a tire, which is another type of isolated vehicle component. In this approach, the 3D profile of automobile tires was determined by using a robotic hand to move a slit-ray generator and camera in multiple axes over the surface of a tire, thus determining the tire section profile shape.

Other prior art, such as Chinese patent CN 203125521U teaches 3D scanning for automobile assembly line inspection. Easterly, U.S. Pat. No. 8,443,301 teaches reporting on vehicle problems using a three dimensional visual interface, but fails to teach automated inspection methods.

In different but related art, Nagle, et. al., in U.S. Pat. No. 8,405,837, disclosed a system and method for inspecting rail road track surfaces using optical wavelength filtering. He taught projecting a laser beam at the rail road track surface, receiving reflected light using a camera, and using a processor to analyze the railroad track bed for deviations in proper crosstie placement.

Modern 3D scanning technology now enables automated sensors to acquire a large amount of sophisticated information regarding the shape and status of various 3D objects. Such sensors include, for example, time-of-flight cameras. Time of flight 3D scanning cameras and methods are described in detail in Hansard, Lee, Choi, and Horaud, "Time-of-Flight Cameras: Principles, Methods, and Applications" (2012). Springer, ISBN 978-1-4471-4657-5. Other types of non-contact 3D scanning methods include triangulation type 3D scanners, structured light scanners, stereoscopic 3D scanners, and the like.

Additionally, modern computer vision automated analysis methods, using modern computer processors and algorithms, has now developed to the point where automated image recognition and inspection methods are now capable of relatively sophisticated analysis. Such methods are discussed in detail in Prince, "Computer Vision: Models, Learning, and Inference" (2012), Cambridge University Press, ISBN 978-1107011793. Other discussion can also be found in Hartley, "Multiple View Geometry in Computer Vision" (2004), Cambridge University Press, ISBN 978-0521540513; as well as Bishop, "Pattern Recognition and Machine Learning" (2007), Springer, ISBN 978-0387310732; Szeliski, "Computer Vision: Algorithms and Applications (Texts in Computer Science) (2010), ISBN 978-1848829343, and the like.

Additionally, modern robotic systems are now capable of very precise automated control and positioning. Such robotic positioning methods are discussed in Jazar, "Theory of Applied Robotics: Kinematics, Dynamics, and Control (2nd Edition)" (2010), Springer ISBN 978-1441917492, and elsewhere.

BRIEF SUMMARY OF THE INVENTION

In one embodiment, the invention may be a system and method for determining the mechanical status of vehicles (e.g. automobiles and the like). These vehicles often comprise an engine with various mechanical components (or parts) and a body, and the body will often have a suspension or other support with its own set of mechanical components. These mechanical components will typically be 3-dimensional components with a variety of surfaces. Although some of these surfaces will be hidden when the components are assembled into an intact or substantially intact vehicle, usually at least some of the surfaces from at least some of these components will be visible surfaces. Indeed vehicle designers often try to design vehicles so that where feasible, components at higher than average risk for wear or damage have exposed (visible) component surfaces to facilitate visual inspection of these more problematic components.

Vehicle designers often create various access panels, (e.g. automobile hoods) that can be easily opened to allow for visual inspection of various component surfaces as well.

According to the invention, at least one mobile 3D scanner, which may be mounted on a movable support such as a mobile robot or robotic appendage, is used to scan at least some of these various visible component surfaces and positions. This results in 3D scanner output of these various visible component surfaces, along with the relative position of these component surfaces.

Typically the scan data from each scan will be annotated with additional information, such as the identity of the vehicle being scanned. This can include the type of vehicle, model year, license plate, VIN, owner name, and the like. As will be discussed shortly, this vehicle identity information is important. The vehicle identity information helps the system distinguish between different scans on different vehicles; can also be used by the system when it attempts to automatically diagnose problems, and for other purposes as well.

To facilitate automatic operation, this least one mobile 3D scanner will generally be capable of being automatically (e.g.

processor) positioned into various locations with respect to the vehicle. For example, the scanner location and control processor can automatically position the 3D scanner near at least some these various mechanical components during the automated scan.

As a result, the 3D scanner output can be automatically correlated with the positions and orientations of the mobile 3D scanner during the scan. For example, if the 3D scanner is mounted on the arm of a mobile robot, the robot may position itself over various portions of the vehicle, move its arm attached scanner, and thus scan relatively large portions of the vehicle engine and suspension during the scan.

The 3D scanner output data from this scan or scans is then typically analyzed by computer, usually by using one or more processors, and various types of computer vision algorithms. This computer analysis will typically utilize a reference database that includes comparative 3D scan data. This reference database that includes comparative 3D scan data may include 3D scans of reference component surfaces from a similar vehicle (usually of the same model type and year as the vehicle that is being scanned). Additionally, the reference database may also include 3D scans from the same vehicle at an earlier time point. Other information, such as heat or infrared scan data, vibration data, motion data, sound data, and the like may also be put into the reference database.

The reference database that includes comparative 3D scan will typically have reference data on the various reference component visible surfaces in one or more proper or acceptable (e.g. "nominal" or "ideal") states, as well as reference data on the various reference component visible surfaces in one or more aberrant (e.g. worn, broken, malfunctioning or otherwise problematic) states. The computer processor (which in some embodiments can be located on a remote server) can then use various types of image or other type of computer vision software or other pattern recognition software to look similarities and differences between the 3D scan data (or other data), and the comparative 3D scan data (and other reference data). When a particular 3D scanned component surfaces matches the reference data or images for an "ideal" component, then that particular component surface will generally be scored as adequate or "nominal".

However if a particular 3D scanned component surface matches the reference data or images for the surface of a component that is in an aberrant state, then the processor can flag this particular component as matching one of these various aberrant states. The system can then do various things with the results, including storing a record of at least the flagged component in memory, outputting the identity of the flagged component, or even forwarding a request for service, or a request for a service cost estimate or authorization, to a repair or insurance facility.

Many other variations on this invention will also be discussed herein.

DETAILED DESCRIPTION OF THE INVENTION

It is envisioned that in normal operation, the invention will be used to scan and assess the state of multiple mechanical components of an intact or substantially intact vehicle, rather than simply scan and assess individual mechanical components while the components are isolated from the vehicle. Mechanical components are 3D objects that, at least in isolation, have various exposed surfaces. However because the system is scanning an intact or substantially intact vehicle, not all surfaces of all vehicle mechanical components will be exposed. Instead, some mechanical components will be hidden entirely (all surfaces hidden), while some mechanical components will only have some of their various surfaces available for scanning.

Some limited exposure of hidden components, such as by moving access panels, or even removing a few blocking components, is contemplated, however. Automobiles, for example, usually have various engine components hidden by a moveable hood, which can be raised or lowered to expose at least some of the various engine components. Within an engine, often one or more major components, such as air filter covers, may in turn block direct viewing of other engine components. Here it is contemplated that when engine scans are desired, at least the hood or other engine cover may be raised, and one or more 3D scanners allowed to move around the engine area, relatively close to the various components, and scan many exposed engine component surfaces. Further, certain engine components, such as air filter covers, air filters, and the like may also be temporarily removed in order to allow the system's 3D scanners access to still more of the engine components. Access panels and removing of blocking components can also be used for scanning other parts of the vehicle as well.

Similarly other portions of intact vehicles, such as the suspension, undercarriage, or at least portions of the chassis of an automobile are effectively hidden from normal view because they are positioned very low to the ground. Here it is contemplated that to facilitate 3D scanning of such regions, the automobile may either be raised (e.g. on a hydraulic or pneumatic lift), or the automobile driven over a recessed area or pit which can allow 3D scanners access to the underside. Alternatively the 3D scanners may be mounted on a low profile arm or other support configured to pass into these low profile areas.

Similarly a boat type vehicle may be placed in dry dock to facilitate automated hull inspection. An airplane may also have various access panels removed to facilitate inspection as well.

As previously discussed, in some embodiments, the invention may be a method of determining the mechanical status at least some components of an intact or substantially intact vehicle, such as an automobile, airplane, motorcycle, boat, and the like. The invention is particularly useful for assessing the mechanical status of automobiles, and automobiles will thus be used as a specific example throughout this disclosure.

Each automobile or other vehicle will generally comprise many different individual mechanical components disposed in various positions about the vehicle. As previously discussed, each individual mechanical component in isolation will of course have multiple visible surfaces, but when assembled into an intact or substantially intact vehicle, some components may be entirely hidden. Others may have only some visible component surfaces. As previously discussed, the invention is intended to operate with those mechanical components that are still attached to an intact or substantially intact vehicle, although some movement of vehicle parts may be required or allowed in order to improve the scope of the analysis.

Although as will be discussed, multiple 3D scanners may be used, and any means to move these 3D scanners across the desired vehicle mechanical component visible surfaces may also be used, in a preferred embodiment, the 3D scanners will be mounted on various mechanical moving surfaces designed to both keep track of the position of the one or more 3D scanners relative to the vehicle being scanned, as well as to precisely position the one or more 3D scanners. This movement and positioning, as well as 3D scanner operation, will usually be done under computer processor and software control.

Figure 1:
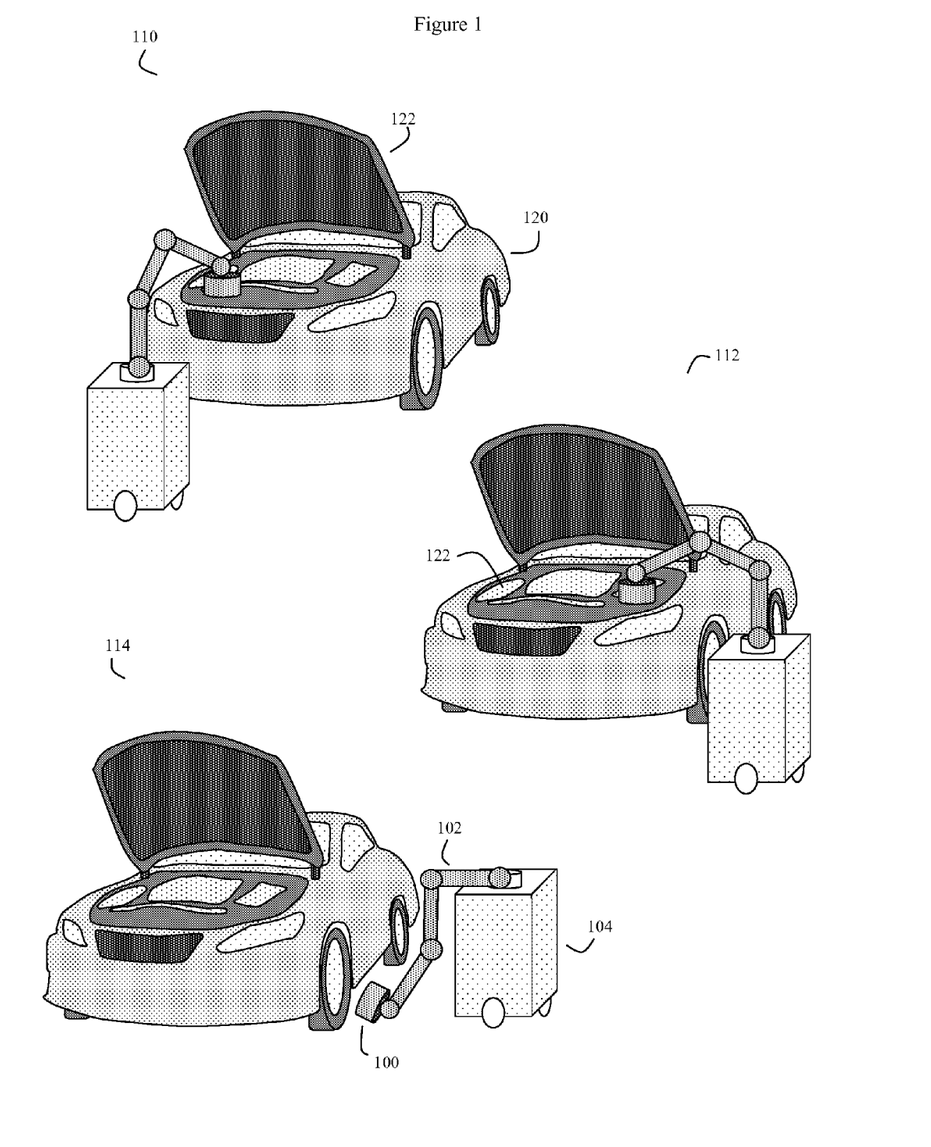
FIG. 1 shows the automated 3D scanner, mounted on a robotic arm of a mobile robot, which in turn is engaged in scanning various exposed component surfaces on an automobile engine.
Figure 2:
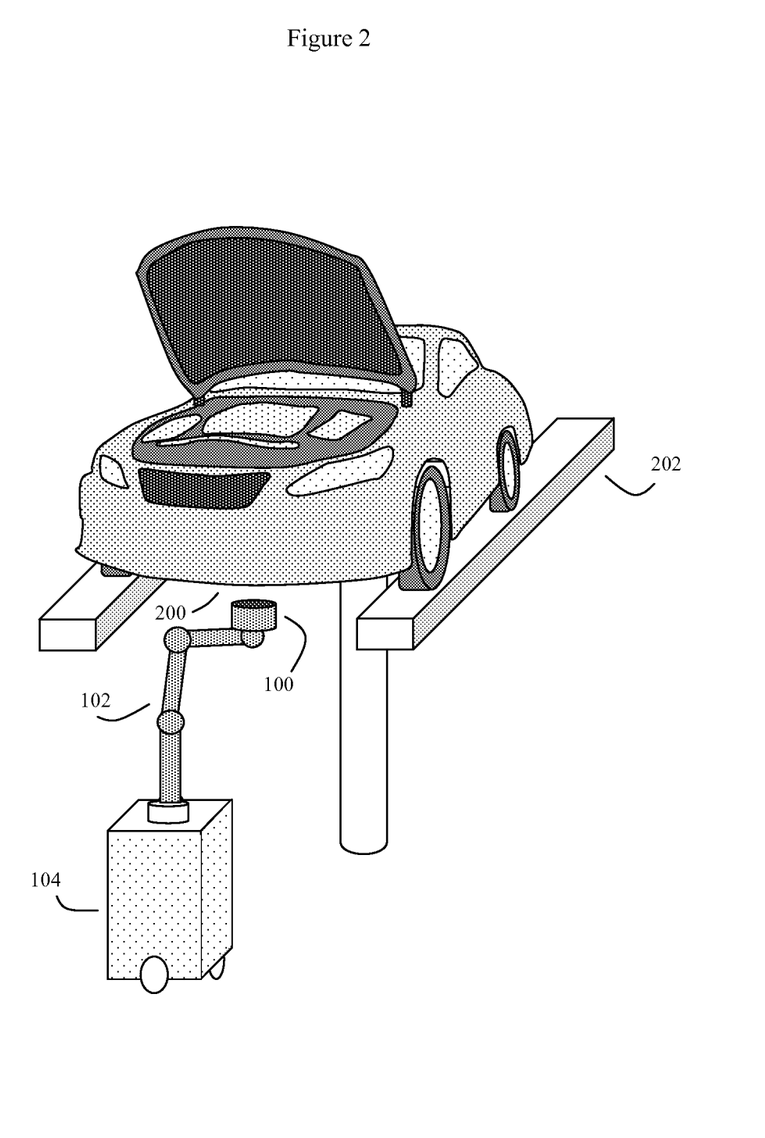
FIG. 2 shows the automated 3D scanner, again mounted on a robotic arm of a mobile robot, now engaged in scanning various exposed surfaces on the underside of an automobile suspension or chassis while the automobile is raised on a hydraulic or pneumatic lift.
Figure 3:
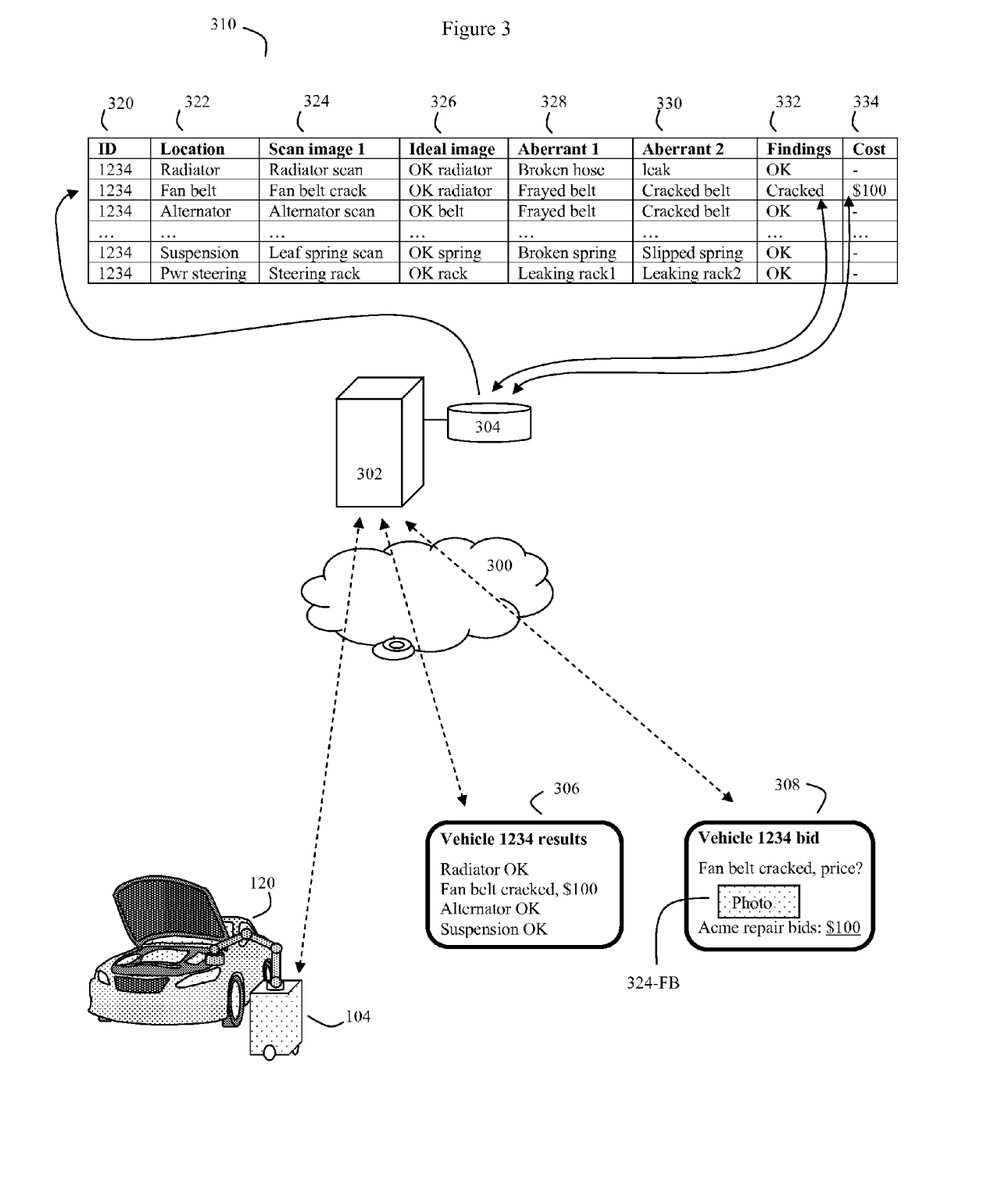
FIG. 3 shows how the automated 3D scanner, again mounted on the robotic arm of a mobile robot, can (with the aid of a processor, network connection, and software) establish an internet connection with a remote Internet server. This remote Internet server can be configured to do some or even all of the 3D scan analysis. This server in turn can transmit analysis results to various users, as well as transmit requests for repair cost estimates for various aberrant components to a repair facility.

In some embodiments, this may be done by coupling the 3D scanners to one or more mobile robots, and more specifically to the mechanical appendages (e.g. arms) of these mobile robots. Here, because such mobile robots tend to be easier to draw, FIGS. 1-3 show an example of the invention operating according to a mobile robot mounted scanner. However it should be understood that this is but one of many alternative configurations contemplated.

FIG. 1 shows an example of an automated 3D scanner (100) (which may include other sensors as well such as infrared sensors, vibration sensors, video cameras, microphones, and the like), operated according to the invention. In this example, the 3D scanner (100) is mounted on a robotic arm (102) of a mobile robot (104). The robot and arm move, generally under the control of at least one computer processor and software, to various positions (110), (112), (114) around the vehicle (120), here an automobile. To facilitate scanning the automobile engine (122), the front hood (122) is up. The robot and robotic arm can thus move around and scan a number of different engine mechanical components (110, 112), as well as a portion of the underside of the automobile (114).

More specifically, in this robotic embodiment, at least one 3D scanner is a mobile 3D scanner that is automatically positioned under computer processor control. Here, at least one 3D scanner is attached to a processor controlled mobile robot (104), and the position and orientation of this processor controlled mobile robot (relative to the vehicle) is controlled by at least one processor and robotic control software. Thus the positions and orientations of at least one 3D scanner are then automatically determined by this mobile robot. The robot can move using wheels, tracks, rails, or for that matter even by propellers, jets and the like (for water based or airborne robots).

To further facilitate precise placement of at least one 3D scanner, in some embodiments, the robot may be further configured with one or more flexible robotic appendages, such as robotic arms (102) and the like. The position and orientation of these robotic arms can also be controlled by at least one processor and associated robotic arm control software. The robot and its control software may be further configured to cause the robot to execute a pre-planned route that passes over multiple mechanical components of the vehicle.

FIG. 2 shows the automated 3D scanner (110), again mounted on a robotic arm (102) of a mobile robot (104), engaged in scanning various exposed surfaces on the underside (200) of an automobile suspension or undercarriage (200) while the automobile is raised on a hydraulic or pneumatic lift (202).

In operation, a human attendant may optionally perform certain preparatory operations such as raising the car hood (122), or taking steps to allow the system to view the suspension or undercarriage, such as is shown in FIG. 2.

The mobile 3D scanner will move around, scanning the various visible component surfaces and positions, and produce at least 3D scanner output data showing the present status of these various visible component surfaces, as well as the present positions of these various surfaces. Here the position data is also useful since sometimes components can be out of their proper locations or alignment. Other data (e.g. video data, infrared data, heat data, sound data, vibration data and the like may also be obtained).

As previously discussed, some of the various types of 3D scanners that may be used, according to the invention, include time-of-flight cameras. Time of flight 3D scanning cameras and methods are described in detail in Hansard, Lee, Choi, and Horaud, "Time-of-Flight Cameras: Principles, Methods, and Applications" (2012). Springer, ISBN 978-1-4471-4657-5. Other types of non-contact 3D scanning methods include triangulation type 3D scanners, structured light scanners (laser scanning cameras), stereoscopic 3D scanners (stereo vision 3D scanners), and the like, may also be used.

As previously discussed, in other embodiments, at least one of the mobile 3D scanners may further be infrared scanners, motion scanners, or other type of vibration sensors. Microphones and other methods to acquire localized sound information may also be used. In this case, the sound data may be compared with sound samples stored in the reference database (to be discussed), and components emitting aberrant sounds while the vehicle is operating also flagged. As previously discussed, to get precise 3D scanner position information, regardless of if the 3D scanner is mounted on a mobile robot or not, typically the mobile 3D scanner will be automatically positioned by use of appropriate computer processors, software, and location sensors so that the positions and orientations of the one or more 3D scanners can be automatically determined during the scan or scans.

Various methods may be used to control and monitor the position of the mobile 3D scanner, including the previously discussed robotic positioning methods are discussed of Jazar, "Theory of Applied Robotics: Kinematics, Dynamics, and Control (2nd Edition)" (2010), Springer ISBN 978-1441917492. Other methods may also be used.

To automatically analyze this scan data, usually at least one computer processor (which need not be the same processor used to control the location of the mobile 3D scanner during the scan) will take this 3D scanner output data, and use various computer vision and pattern algorithms to analyze this data using a reference computer database that contains at least reference or comparative 3D scan data. Typically this reference or comparative 3D scan data will comprise, for example, various 3D scans of corresponding components, ideally from the same make and model as the vehicle being scanned. These corresponding components can include scans showing the various component surfaces of components in their "ideal" (e.g. adequate, "nominal", operating, no-problem) states as well as scans showing the various component surfaces of the components in various aberrant (e.g. non-adequate, worn, broken, problematic, malfunctioning) states. Alternatively 3D model data may also be used for at least some of this corresponding component reference information.

As previously discussed, some of the computer vision methods that may be used to analyze the 3D scan data include methods previously described by Prince, "Computer Vision: Models, Learning, and Inference" (2012), Cambridge University Press, ISBN 978-1107011793. Other discussion can also be found in Hartley, "Multiple View Geometry in Computer Vision" (2004), Cambridge University Press, ISBN 978-0521540513; as well as Bishop, "Pattern Recognition and Machine Learning" (2007), Springer, ISBN 978-0387310732; Szeliski, "Computer Vision: Algorithms and Applications (Texts in Computer Science) (2010), ISBN 978-1848829343, and the like.

It should be clear that because many different makes and models of automobiles (or other vehicles) exist, generally each vehicle make and model may often have to be analyzed by the system on a vehicle specific basis. Thus this reference or comparative computer database is often quite extensive. It is envisioned that at least initially, only the more popular makes and models of vehicles will be included in the reference database, but with time this database may be expanded still further.

The reference or comparative database may also be extended by storing previous 3D scan data from the vehicle being scanned (e.g. the results from previous maintenance scans of this vehicle). The reference data from previous scans of the same vehicle can then be used to help analyze the present state of the vehicle. Thus trends, such as increasing fraying and wearing of various components, and the like, may be tracked over time and future problems automatically anticipated by the system.

Typically, along with the 3D scan data, information relating to the identity of the vehicle being scanned will also be entered into the computer database in a manner that allows the 3D scan data to be linked with the vehicle identity, and usually often the make and model of the vehicle.

According to the invention, at least one computer processor and the previously discussed image recognition software will then be used to determine both similarities and differences between the vehicle's 3D scanner output data (from that particular scan), and various types of comparative 3D scan data. This comparison will typically identify at least the portions of the visible component surfaces that were visible during the 3D scan, and typically also flag those various mechanical components that may match the various previously identified aberrant mechanical component states that were previously stored in the reference or comparison portion of the computer database. The system will then typically flag those mechanical components suspected of being an aberrant state or condition. At a minimum, the system will then store these flagged mechanical component states in computer memory, and/or output data (usually vehicle identified data) pertaining to those flagged mechanical components suspected of being in an aberrant state or condition.

In some embodiments, at least some of the vehicle's various mechanical components (for example, the engine) may be operating during the scan. This can be quite useful for diagnosing problems, because while operating, at least some of the components will be emitting heat or sound, be vibrating or otherwise moving during the scan. As a result, there will be sounds, vibrations, motions, heat changes, and sounds emitted by at least some of the operating components that can be detected during the 3D scan.

Thus, at least when at least one mobile 3D scanner is further configured to detect at least some of this heat, sound, vibration or motion data, and transmits this along with the 3D scanner output data, this additional data can also be used to help flag problematic components as well. To do this, the reference computer database of comparative 3D scan data can further contain additional data pertaining to the heat signatures, sound signatures, vibration signatures, or motion signatures (or images) of at least some of the various components while operating. This reference data can include examples of normal (e.g. ideal) operation as well as examples various types or states of abnormal or aberrant operation.

In this expanded scheme, at least one computer processor can then also determine differences between the observed heat, sound, vibration, or motion data, and the reference computer database of reference data, and further determine if any of this additional data further identifies that any of the mechanical components further match various identified aberrant states.

Thus for example, if a vehicle engine ball-bearing component is going bad, this may show up both as an abnormal appearance on a 3D scan, and an abnormal heat (e.g. infrared image) signature for the bearing (unusually hot). Additionally an abnormal sound signature for the bearing (unusually loud sound), and possibly abnormal vibration or motion may be detected as well. Any one of these, when matched with previously identified reference data on bad bearings, can be used by the system to automatically identify and flag that this engine component is bad, and needs maintenance or replacement.

Although in some embodiments, the reference computer database of comparative 3D scan data, and the one or more processors used to analyze the 3D scan data, may be located on or near the various 3D scanners and mechanisms used to produce the 3D scan data, this need not always be the case. Rather, in some embodiments, at least portions of the reference computer database of comparative 3D scan data may be located remotely, such as on one or more remote servers. Typically such servers will be Internet servers, with a network connection to the 3D scanner apparatus over a computer network such as the Internet.

FIG. 3 shows how the automated 3D scanner (100), again mounted on the robotic arm (102) of a mobile robot (104), can establish an internet connection (300) with a remote Internet server (302) and reference computer database (304) configured to do some or even all of the 3D scan analysis. This server (302) in turn can transmit analysis results to various users' computerized devices (306), as well as transmit requests for repair cost estimates for various aberrant components to one or more repair (or insurance, or other third party) facility computerized devices (308).

Typically such computer servers (302) and associated memory storage devices (304) will comprise at least one computer processor, memory, network interfaces (e.g. network connection devices), operating system software (e.g. Linux, Unix, Windows, or other type operating system), database software (e.g. SQL software such as MySQL, MariaDB, and the like), various languages (e.g. Perl, PHP, Ruby, etc.), and often also web server software (e.g. Apache and the like), as well as the previously discussed image interpretation software. In some embodiments, the servers (302) may also contain software to operate one or more of the various 3D scanning devices on a remote basis.

For example, if a vehicle owner has his vehicle scanned according to the invention, the vehicle identified data pertaining to at least the vehicle's various problematic (e.g. flagged) mechanical components can be stored or retained on server (302) and/or database (304). This owner can then use his computerized device (306) (e.g. a smartphone, tablet computer, desktop computer, and to contact server (302), transmit the vehicle identity information to the server, and also transmit a query regarding the status of the vehicle.

In response to this status query, server (302) can in turn use the vehicle identity as a search key for database (304), find the problematic (flagged) mechanical components, and transmit the appropriate (e.g. vehicle identity specific) information pertaining to those flagged mechanical components back to device (306). In FIG. 3, for example, a query regarding the status of vehicle "1234" gets a result back from the server (302) showing that the vehicle's radiator is OK, but the fan belt is cracked. However the vehicle's alternator and suspension are OK.

As another example, assume the previous scan has been done, and again the flagged mechanical component is a cracked fan belt. Either before or after the previous inquiry, the server (302) can be either manually or automatically be instructed to transmit this information (e.g. information pertaining to the vehicle's identity and at least some of the various flagged mechanical components) to various other parties, such as computerized devices (308) associated with a vehicle repair facility, an insurance company, dealership, or other person or entity. Here we will assume that this other entity is a computerized device associated with a vehicle repair facility.

In this example, the repair facility computerized device (308) can receive information pertaining to the vehicle identity, as well as information pertaining to the flagged mechanical component, again here a cracked fan belt. In addition to the flag, this information could also contain various results from the 3D scan, such as a photo, or other information such as video, sound data, heat sensor data (e.g. infrared photographs), vibration data, and the like. The repair facility, here called "Acme" can then enter in their estimated bid for repairs (here $100), and this can be transmitted back to one or more interested parties, such as the user of the vehicle (306).

More specifically, at least one computerized device associated with a vehicle repair or insurance facility can then be used to transmit estimated repair costs (or insurance authorization) for at least some of the various flagged mechanical components associated with the vehicle (120) to the Internet server (302). These estimated repair costs (or insurance information) can then be stored in the server's database (304). Later, in response to a vehicle identity and status inquiry (for example from computerized device (306), Internet server (302) and database (304) can be used to again use the vehicle identity to look up the various flagged mechanical components in the database, along with the estimated repair costs and/or insurance authorization. These estimated repair costs can then be sent to another computerized device such as (306).

To go into this process in more detail, consider an example of one type of data structure (e.g. computer memory data structure for database 304) that may be used by the computer server (302) and database (304) to manage the invention is shown in (310). In this example, the data structure stores the vehicle identifier (ID) (320), the vehicle location where the various mechanical component 3D scans were located (Location) (322), the actual 3D scan data (Scan image 1) (324), and various types of reference scans or information showing the various components in ideal or normal states (Ideal image) (326), and various aberrant states (Aberrant 1, Aberrant 2) (328, 330). Additionally the "flags" or conclusions from the automated analysis (Findings) (332) and also the repair facility cost estimates (Cost) (334) are also shown.

In this example, robotic 3D scanner (104) scans vehicle (120), and the 3D scanner output data is transmitted over the internet (300) to Internet connected server (302). Server (302) in turn receives this 3D scanner output data, along with the vehicle identity information, and stores it in the database data structure (310) in locations (320, 322).

The server (302) can then use its at least one computer processor (or alternatively delegate analysis to a different computer processor) to analyze this 3D scanner output data (324) versus a computer database of comparative 3D scan data (326, 328, 330). This comparative 3D scan data can comprise various 3D scans of the comparable mechanical components of comparable vehicles in both ideal (e.g. normal) states (326), as well as various previously identified aberrant states (328, 330). This comparable data can be actual images of comparable components, directives to image recognition software as to how to recognize aberrant components, or synthetic information such as information obtained from 3D models of the mechanical components in various states. See FIG. 4 for a more specific example.

The system can then use at least one computer processor and the previously discussed image recognition software to analyze the 3D scanner output data (324) (and optionally other data), and the various types of reference comparative 3D scan data (328), (330). The software can then determine similarities and differences. The system can then flag (332) those mechanical components that match one or more previously identified aberrant states.

In FIG. 3, for example, the scans of the various mechanical components of vehicle "1234" show that the vehicle's engine radiator and alternator (324) returned ideal (e.g. nominal) 3D scanner output data, as did the vehicle suspension leaf spring and steering rack. However because the fan belt was flagged, the system may be programmed to transmit the 3D scanner data of the fan belt image of a cracked belt (FIG. 4 324-FB) to the repair facility device (308) as well.

Figure 4:
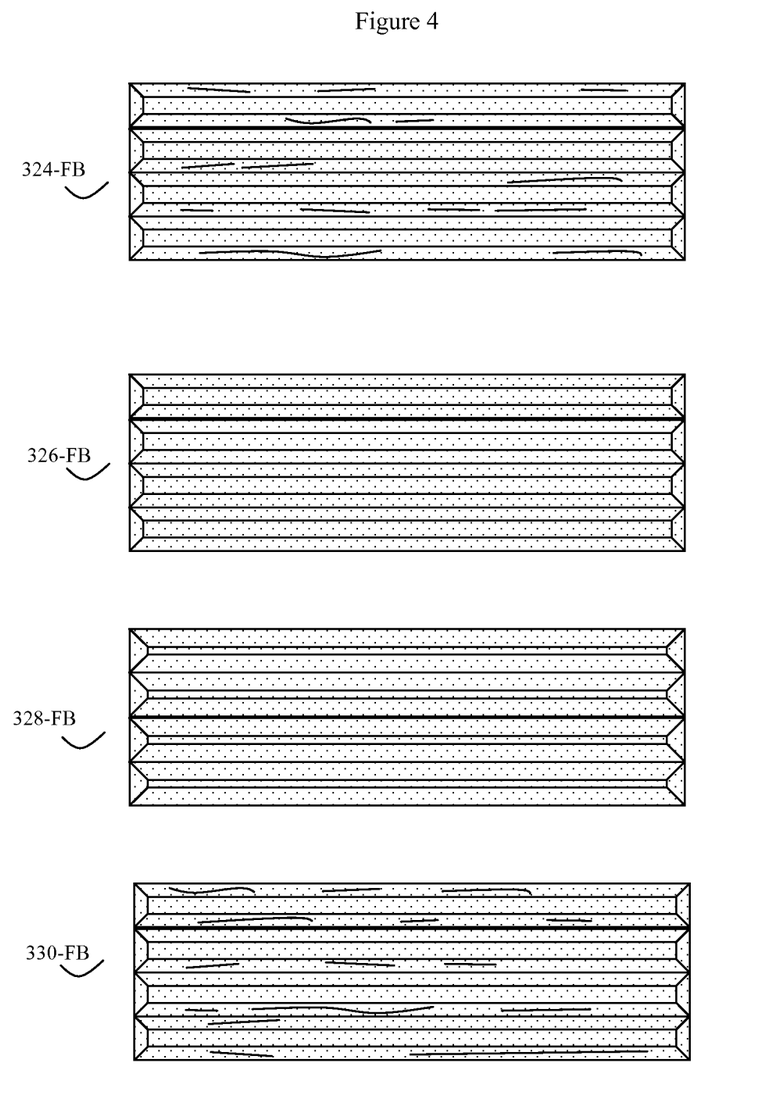
FIG. 4 shows an example of a 3D scan of a section of a fan belt (324-FB), along with various images from a reference computer database of comparative 3D scan data. The reference database includes data and images of an ideal (nominal) fan-belt (326-FB), a worn (aberrant state 1) fan belt (328-FB), and a cracked (aberrant state 2) fan belt 330-FB). The system's computer vision software and pattern recognition software takes the 3D scan fan belt (324-FB) as input, and compares this to the reference data. Here the conclusion would be that the scan most closely resembles the cracked fan belt (330FB). The system can then flag the scanned fan belt as being in an aberrant-2 state (cracked).

FIG. 4 shows an example of a 3D scan of a section of a fan belt (324-FB), along with various images from a reference computer database (310, 304) of comparative 3D scan data. The reference database includes data and images of an ideal (nominal) fan-belt (326-FB), a worn (aberrant state 1) fan belt (328-FB), and a cracked (aberrant state 2) fan belt 330-FB). The system's computer vision software and pattern recognition software takes the 3D scan fan belt (324-FB) as input, compare this to the reference data. Here the conclusion would be that the scan most closely resembles the cracked fan belt (330FB). The system can then flag the scanned fan belt as being in an aberrant-2 state (cracked).

Here the image recognition software analyzed all of the various 3D scan images, and returned the results that the radiator, alternator, leaf spring, and steering rack were OK. (332). However the image recognition software also identified that the fan belt component 3D scan matched that of an aberrant 2 reference image (330). Thus the system flagged the fan belt as being cracked (332). When the repair facility computerized device was contacted for a repair estimate, the 3D scan image of the cracked fan belt was transmitted to device (308) as the photo in order to assist in generating a repair estimate. Similarly the repair estimate (here $100) entered into device (308) was transmitted back through the internet (300) and stored in the database (334).

Thus the internet server (302) can be used to store or transmit vehicle identified data pertaining to at least those mechanical components that match said one or more previously identified aberrant states.

The invention claimed is:

1. A method of determining a mechanical status of a vehicle, said vehicle comprising an automobile with a plurality of mechanical components at different positions on said vehicle, at least some of said mechanical components having visible component surfaces, method comprising:

using at least one mobile 3D scanner to scan these visible component surfaces and positions, thereby producing 3D scanner output data of at least some of these visible component surfaces and positions;

said at least one mobile 3D scanner configured to be automatically positioned on a robotic arm under processor control, near a plurality of said mechanical components during said scan so that the positions and orientations of said at least one mobile 3D scanner can be automatically determined during said scan;

using at least one computer processor to analyze said 3D scanner output data versus a computer database of comparative 3D scan data, said comparative 3D scan data comprising at least one of 3D scans of similar or identical vehicles in both ideal and previously identified aberrant states, or 3D models of the similar or identical vehicles in both ideal and previously identified aberrant states;

further inputting the identity of said vehicle into said computer database, and linking said identity with said 3D scanner output data;

using said at least one computer processor and image recognition software to determine differences between said 3D scanner output data, and said comparative 3D scan data, thereby determining and flagging those said plurality mechanical components that match one or more previously identified aberrant states;

and storing or outputting vehicle identified data pertaining to at least those flagged mechanical components.

2. The method of claim 1, wherein said at least one mobile 3D scanner configured to be automatically positioned under processor control is attached to a processor controlled mobile robot; and the position and orientation of said processor controlled mobile robot, relative to said vehicle are controlled by said processor;

and said positions and orientations of said at least one mobile 3D scanner are automatically determined by said processor controlled mobile robot.

3. The method of claim 2, wherein said processor controlled mobile robot is further configured with a plurality of 3D scanners, at least some of said plurality of 3D scanners affixed to flexible robotic appendages, and said processor controlled mobile robot is further configured to execute a pre-planned route that passes over multiple mechanical components of said vehicle.

4. The method of claim 1, wherein at least one mobile 3D scanner is a time-of-flight camera, laser scanning camera, or stereo vision 3D scanner.

5. The method of claim 4, wherein said vehicle has an engine, and said at least one mobile 3D scanner further comprises at least one of an infrared sensor, vibration sensor, video camera, or at least one microphone configured to detect problems in said engine while said engine is operating.

6. The method of claim 1, wherein at least some of said vehicle's plurality of mechanical components are engine mechanical components that are operating during said scan, thereby causing vibrations, or motions, or heat changes in at least some of operating components during said scan;

wherein said at least one mobile 3D scanner is further configured to detect said vibrations or motions or sound or heat changes in at least some of said vehicle's operating components during said scan, and transmit operating component vibration or motion or sound or heat data to said computer database of comparative 3D scan data along with said 3D scanner output data;

wherein said computer database of comparative 3D scan data further comprises vibration or motion or sound or heat data of operating components in said similar or identical vehicles in both ideal and previously identified aberrant states;

further using said at least one computer processor to determine differences between said vibration or motion or sound or heat data and computer database comparative 3D scan data, and further determine if said vibration or motions or sound or heat data further identifies if any of said mechanical components further match previously identified aberrant states.

7. The method of claim 1, wherein at least some of said plurality of mechanical components comprise engine components, and said previously identified aberrant states provides information pertaining to a need for maintenance of at least some of said engine components.

8. The method of claim 1, wherein said computer database of comparative 3D scan data comprises comparative 3D scan data comprising at least one of 3D scans of similar or identical vehicle engines in both ideal and previously identified aberrant states, or 3D models of the engines of similar or identical vehicles in both ideal and previously identified aberrant states;

and wherein said comparative 3D scan data resides on at least one server that is located remotely from said at least one mobile 3D scanner, but which is able to exchange data with said at least one mobile 3D scanner over a computer network.

9. The method of claim 1, further storing said vehicle identified data pertaining to said flagged mechanical components on at least one Internet server;

further using at least one computerized device to transmit a vehicle identity and status inquiry to said Internet server;

said vehicle identity comprising an automobile model year and type of automobile;

wherein in response to said vehicle identity and status inquiry, further using said Internet server to associate said vehicle identity with said flagged mechanical components, and transmitting vehicle identity specific information pertaining to those flagged mechanical components to said computerized device.

10. The method of claim 9, further using said at least one Internet server to automatically transmit information pertaining to said vehicle identity and at least some of said flagged mechanical components to at least one computerized device associated with a vehicle repair or insurance facility;

wherein said flagged mechanical components comprise vehicle engine components;

using said at least one repair or insurance facility computerized device to transmit estimated repair costs or insurance authorization for at least some of said flagged mechanical components associated with said vehicle identity to said at least one Internet server;

storing said estimated repair costs or insurance authorization in said at least one Internet server database; and in response to said vehicle identity and status inquiry, further using said Internet server to associate said vehicle identity with said flagged mechanical components and said estimated repair costs or insurance authorization, and further transmitting vehicle identity specific information pertaining to those flagged mechanical components and estimated repair costs or insurance authorization to said computerized device.

11. A method of determining a mechanical status of a vehicle, said vehicle comprising an automobile with a plurality of mechanical components at different positions on said vehicle, at least some of said mechanical components having visible component surfaces, method comprising:

using at least one mobile 3D scanner to scan these visible component surfaces and positions, thereby producing 3D scanner output data of at least some of these visible component surfaces and positions;

said at least one mobile 3D scanner configured to be automatically positioned on a robotic arm under processor control, near a plurality of said mechanical components during said scan so that the positions and orientations of said at least one mobile 3D scanner can be automatically determined during said scan;

using at least one computer processor to analyze said 3D scanner output data versus a computer database of comparative 3D scan data, said comparative 3D scan data comprising at least one of 3D scans of similar or identical vehicles in both ideal and previously identified aberrant states, or 3D models of the similar or identical vehicles in both ideal and previously identified aberrant states;

further inputting the identity of said vehicle into said computer database, and linking said identity with said 3D scanner output data;

using said at least one computer processor and image recognition software to determine differences between said 3D scanner output data, and said comparative 3D scan data, thereby determining and flagging those said plurality mechanical components that match one or more previously identified aberrant states;

and storing vehicle identified data pertaining to at least those flagged mechanical components on at least one Internet server;

further using said at least one Internet server to automatically transmit information pertaining to said vehicle identity and at least some of said flagged mechanical components to at least one computerized device associated with a vehicle repair or insurance facility;

wherein said vehicle has an engine, and wherein said flagged mechanical components comprise vehicle engine components;

using said at least one repair or insurance facility computerized device to transmit estimated repair costs or insurance authorization for at least some of said flagged mechanical components associated with said vehicle identity to said at least one Internet server and storing said estimated repair costs or insurance authorization in said at least one Internet server database;

further using at least one computerized device to transmit a vehicle identity and status inquiry to said Internet server;

wherein in response to said vehicle identity and status inquiry, further using said Internet server to associate said vehicle identity with said flagged mechanical components, and transmitting vehicle identity specific information pertaining to those flagged mechanical components and estimated repair costs or insurance authorization to said computerized device.

12. The method of claim 11, wherein said at least one mobile 3D scanner configured to be automatically positioned under processor control is attached to a processor controlled mobile robot;

the position and orientation of said processor controlled mobile robot, relative to said vehicle are controlled by said processor;

said positions and orientations of said at least one mobile 3D scanner are automatically determined by said processor controlled mobile robot; and wherein said at one mobile 3D scanner is affixed to at least one flexible robotic appendage, and said processor controlled mobile robot is further configured to execute a pre-planned route that passes over multiple mechanical components of said vehicle.

13. The method of claim 11, wherein at least one mobile 3D scanner is a time-of-flight camera, laser scanning camera, or stereo vision 3D scanner; and wherein said at least one mobile 3D scanner further comprises at least one of an infrared sensor, vibration sensor, video camera, or at least one microphone configured to detect problems in said engine while said engine is operating.

14. The method of claim 11, wherein at least some of said vehicle's plurality of mechanical components are engine mechanical components that are operating during said scan, thereby causing vibrations or motions or sound or heat changes in at least some of operating components during said scan;

wherein said at least one mobile 3D scanner is further configured to detect said vibrations or motions or sound or heat changes in at least some of said vehicle's operating components during said scan, and transmit operating component vibration or motion or sound or heat data to said computer database of comparative 3D scan data along with said 3D scanner output data;

wherein said computer database of comparative 3D scan data further comprises vibration or motion or sound or heat data of operating components in said similar or identical vehicles in both ideal and previously identified aberrant states;

further using said at least one computer processor to determine differences between said vibration or motion or sound or heat data and computer database comparative 3D scan data, and further determine if said vibration or motion or sound or heat data further identifies if any of said mechanical components further match previously identified aberrant states; and wherein at least some of said plurality of mechanical components comprise engine components, and said previously identified aberrant states provides information pertaining to a need for maintenance of at least some of said engine components.

15. A method of using at least one Internet connected server comprising a computer database, at least one computer processor, and an Internet network connection to determine a mechanical status of a vehicle, said vehicle comprising an automobile with a plurality of mechanical components at different positions on said vehicle, at least some of said mechanical components having visible component surfaces, said method comprising:

receiving, on said at least one Internet connected server, 3D scanner output data produced by at least one mobile 3D scanner that resulted from scanning at least some of said visible component surfaces and positions;

further receiving, on said at least one Internet connected server, information pertaining to a vehicle identity of said vehicle;

said vehicle identity comprising an automobile model year and type of automobile;

using said at least one computer processor to analyze said 3D scanner output data versus a computer database of comparative 3D scan data, said comparative 3D scan data comprising at least one of 3D scans of similar or identical vehicles with an engine operating in both ideal and previously identified aberrant states, or 3D models of the of similar or identical vehicles with an engine operating in both ideal and previously identified aberrant states;

using said at least one computer processor and image recognition software to determine differences between said 3D scanner output data, and said comparative 3D scan data, thereby determining and flagging those said mechanical components that match one or more previously identified aberrant states;

and using said at least one Internet connected server to store or transmit vehicle identified data pertaining to at least those mechanical components that match said one or more previously identified aberrant states.

16. The method of claim 15, further storing vehicle identified data pertaining to at least those mechanical components that match said one or more previously identified aberrant states on said at least one Internet connected server;

further receiving, on said at least one Internet connected server, said vehicle identity and status inquiry from a remote computerized device;

wherein in response to said inquiry, further using said at least one Internet connected server to associate said vehicle identity with those mechanical components that match one or more previously identified aberrant states, at least some of said aberrant states comprising aberrant engine operation states, and transmitting information pertaining to those mechanical components that match said previously identified aberrant states, and information pertaining to said aberrant states, to said remote computerized device.

17. The method of claim 16, further using said at least one Internet connected server to transmit vehicle identified data pertaining to at least those mechanical components that match said one or more previously identified aberrant states, and said information pertaining to said aberrant states, and a request for estimated repair costs to at least one computerized device associated with vehicle repair or insurance functions;

receiving said estimated repair costs or insurance authorization from said at least one remote computerized device associated with vehicle repair functions;

storing said estimated repair costs or insurance authorization in a repair database;

wherein when said at least one Internet connected server receives said vehicle identity and status inquiry from said at least one remote computerized device, further transmitting information pertaining to said estimated repair costs or insurance authorization to said remote computerized device.

18. The method of claim 15, wherein when at least some of said vehicle's plurality of mechanical components are operating engine components, at least some of these operating engine components are subject to vibration or motions or sound or heat changes, and said computer database of comparative 3D scan data further comprises vibration or motion or sound or heat change data of operating engine components of said similar or identical vehicles in both ideal and identified aberrant states of engine operation;

wherein said 3D scanner output data further comprises information pertaining to vibrations or motions or sound or heat changes in at least some of said operating engine components;

further using said at least one computer processor to determine differences between said vibration or motion or sound or heat change data and said computer database comparative 3D scan data, and further determining if said vibration or motion or sound or heat change data further identifies if any of said mechanical components match said vibration or motion or sound or heat change data identified aberrant status.

19. The method of claim 15, wherein at least some of said plurality of components comprise engine components, and said previously identified aberrant states provides information pertaining to a maintenance status of said engine components.

* * * * *